Figure 1:
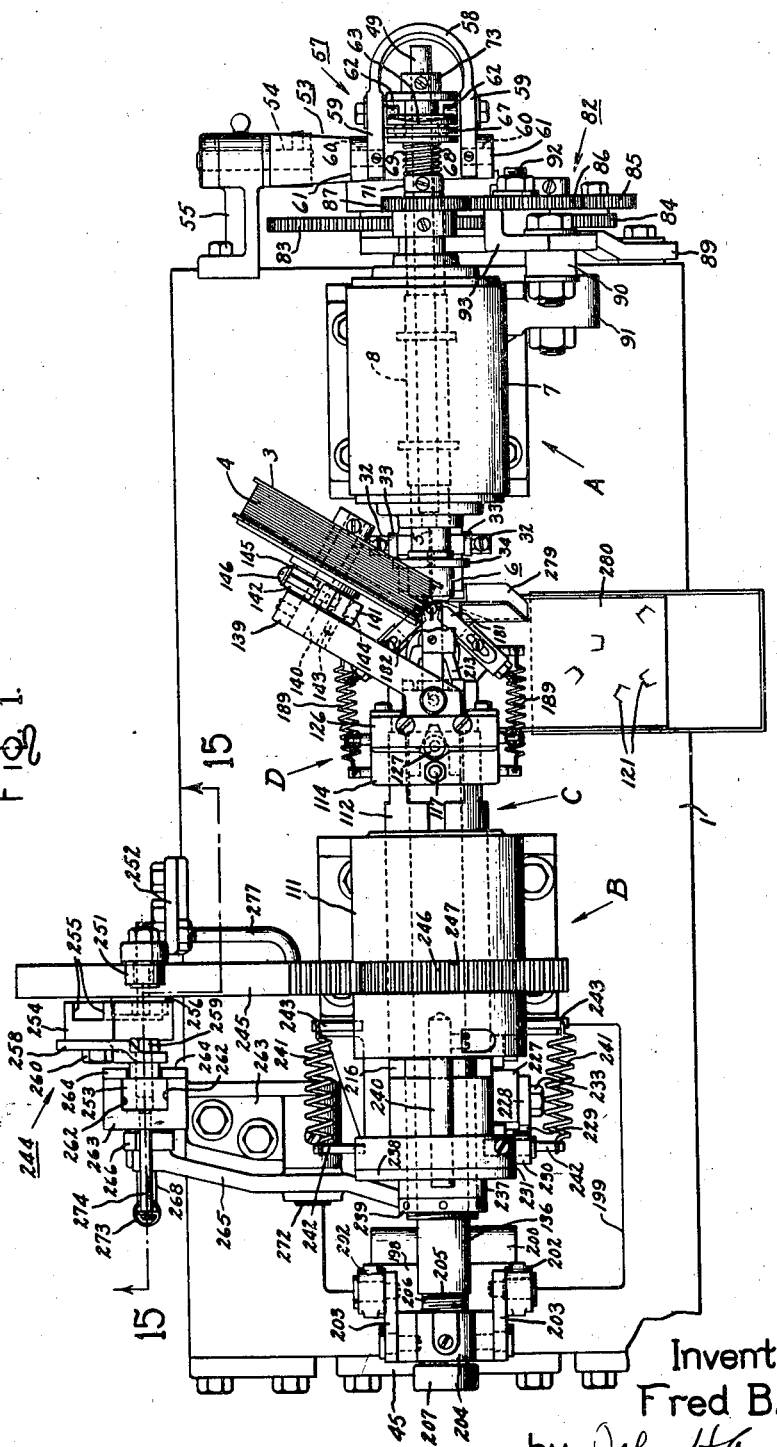

Inventor:
Fred B. Iden,
by John H Anderson
His Attorney.

April 20, 1948.  F. B. IDEN  2,439,893
FILAMENT COILING APPARATUS
Filed Aug. 1, 1945  7 Sheets-Sheet 3
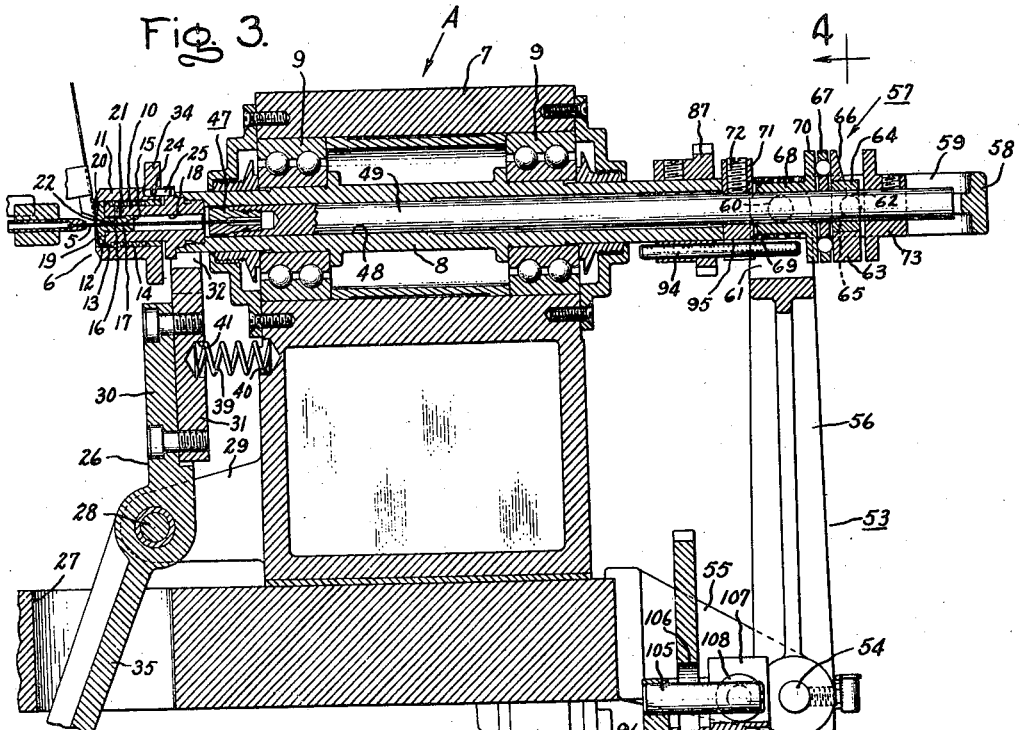
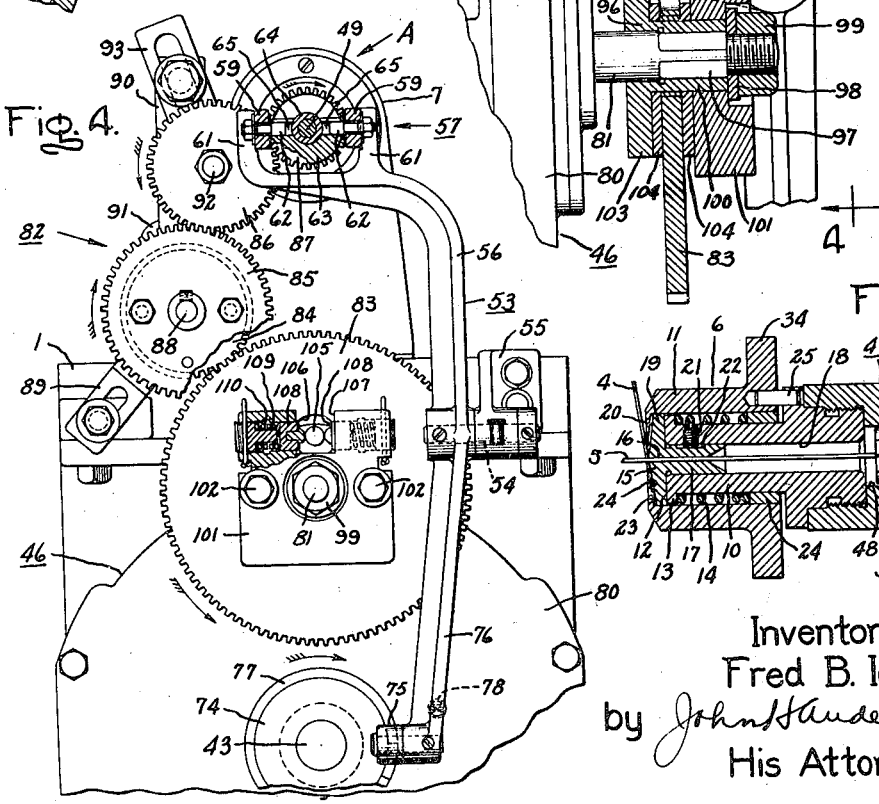
Inventor:
Fred B. Iden,
by John H Anderson
His Attorney.

April 20, 1948.  F. B. IDEN  2,439,893
FILAMENT COILING APPARATUS
Filed Aug. 1, 1945  7 Sheets-Sheet 4
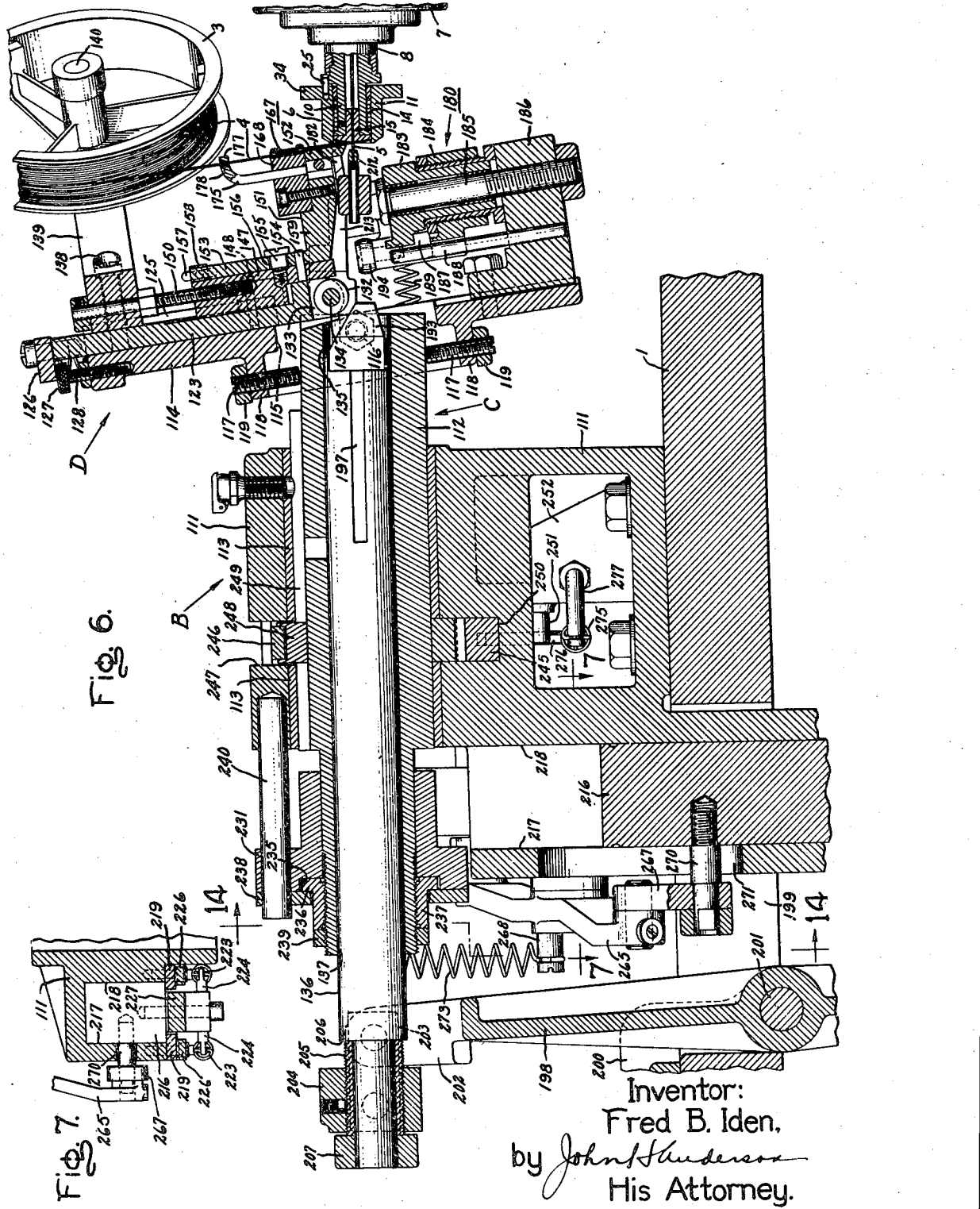
Inventor:
Fred B. Iden,
by John Henderson
His Attorney.

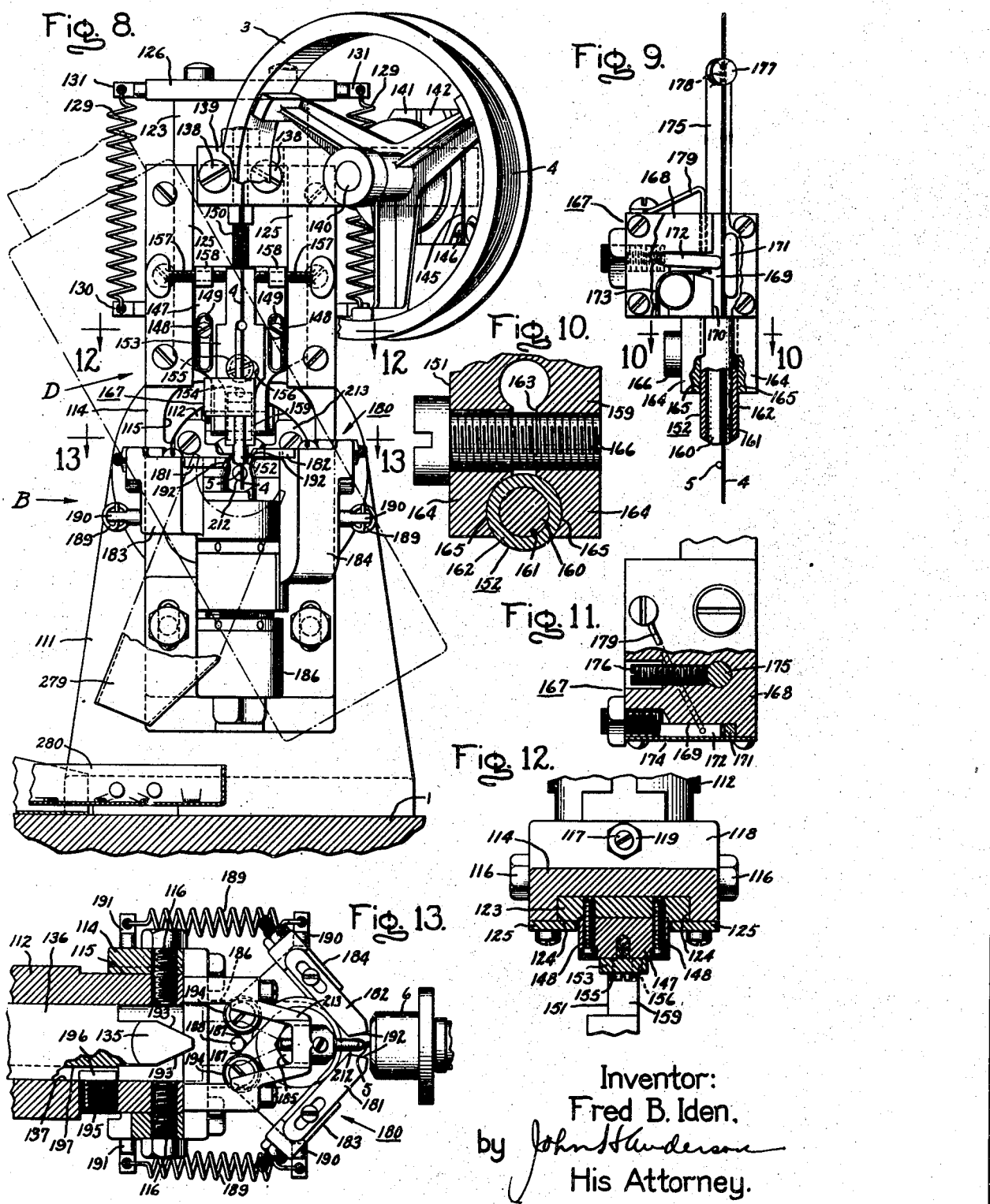

April 20, 1948.  F. B. IDEN  2,439,893
FILAMENT COILING APPARATUS
Filed Aug. 1, 1945  7 Sheets—Sheet 6

Inventor:
Fred B. Iden,
by John H Anderson
His Attorney.

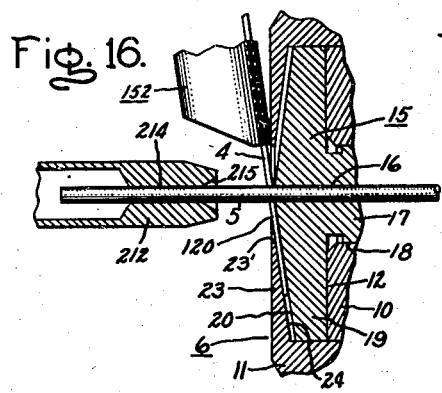
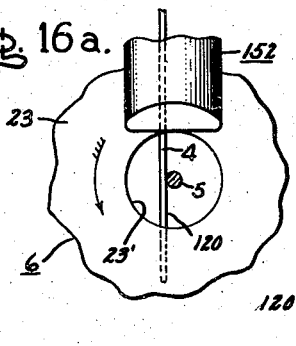
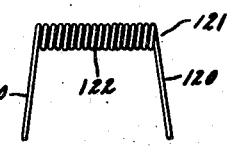
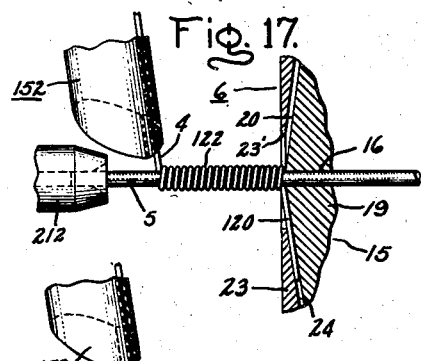
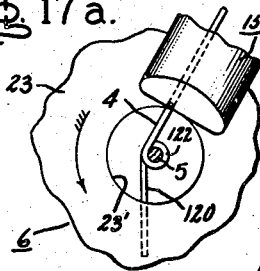
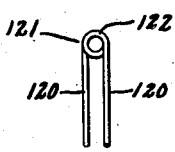
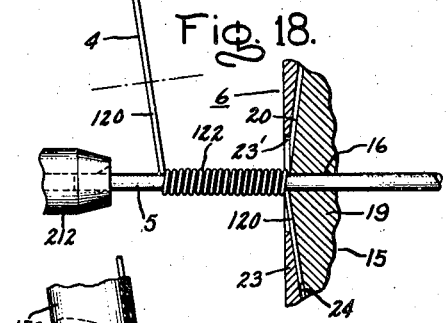
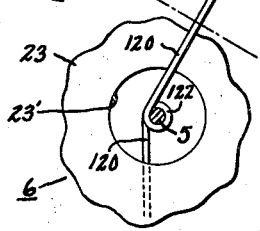
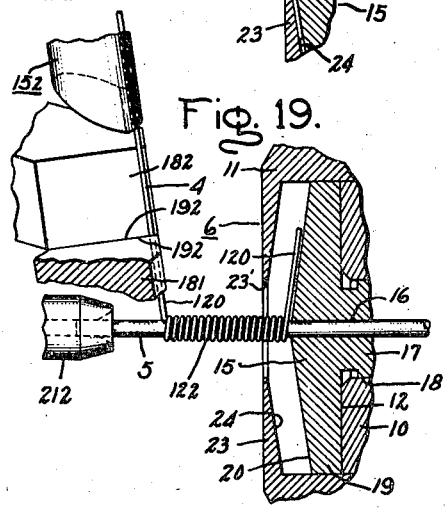
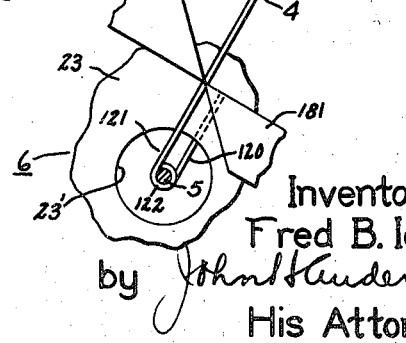
Inventor:
Fred B. Iden,
by John H Henderson
His Attorney.

Patented Apr. 20, 1948

2,439,893

UNITED STATES PATENT OFFICE 2,439,893

FILAMENT COILING APPARATUS

Fred B. Iden, Cleveland Heights, Ohio, assignor to General Electric Company, a corporation of New York Application August 1, 1945, Serial No. 608,115

25 Claims. (Cl. 153—67)

1

My invention relates, in general, to apparatus for coiling fine wire into filaments for electric incandescent lamps and other similar electrical devices. More particularly, my invention relates to a fully automatic machine for successively forming individual coiled filaments having straight or uncoiled end legs extending transversely of the axis of the coiled portion.

The formation of coiled lamp filaments is a very exacting and difficult operation inasmuch as the said filaments, in order to function properly, must be extremely uniform as to length of wire, length and diameter of the coiled portion, and number and pitch of the turns of the coiled portion. Moreover, where a coiled filament having straight or uncoiled end leg portions extending transversely from the coiled portion is required to be accurately mounted in a definite position on the lamp leading-in wires, it is highly essential that the said leg portions be uniformly positioned relative to one another and to the coiled portion.

In one type of automatic coiling machine in use at present for forming such filaments, the filament wire is fed transversely to a mandrel from a reel or spool. The free end of the filament wire is first inserted and clamped in a chuck or gripper which holds the wire across the mandrel, the wire clamped in the chuck forming one leg of the filament which is to be ultimately formed. The mandrel and the chuck are then rotated while the filament wire is simultaneously fed transversely to and drawn longitudinally of the mandrel, to thereby cause the wire to be coiled around the mandrel. The chuck and mandrel are rotated a given number of revolutions to produce a definite number of turns, after which the wire fed to the mandrel is cut at the required distance from the mandrel to thereby form the other leg of the filament. The mandrel is then withdrawn from the coil and the filament removed from the chuck.

Upon release of one or the other of the filament legs from its holding or restraining means, such as by the opening of the chuck holding the one filament leg or by the cutting of the supply wire to form the other leg, the coiled wire portion uncoils or opens a certain amount on the mandrel. The amount of such uncoiling depends on the springiness of the particular wire being used. This springiness is apt to vary considerably from one reel of wire to the next so that the amount of uncoiling, and therefore the angular position of the end legs of the filament, will likewise vary. To overcome this difficulty, means have been heretofore provided for rotating the head carrying

2 the wire supply reel one way or the other about the mandrel axis, during the coiling of the wire around the mandrel, to thereby add or subtract a fraction of a turn from the coil (depending on the springiness characteristic of the particular wire being used) and thus cause the end legs of the filament to uniformly possess the same angular relation with one another following the release and resulting uncoiling of the filament on the mandrel. However, the degree of rotation of the wire feeder head obtainable with such prior constructions has been necessarily limited to a relatively small amount by reason of the limited effective cutting range or field of the wire cut-off knives which heretofore have been mounted separately from the wire feeder head. As a result, such prior machines did not possess the flexibility required to compensate for the different wire uncoiling characteristics normally encountered in filament manufacture so as to produce the desired filament leg positioning. In addition, the rotation of the wire feeder head about the mandrel during the coiling operation did not proceed at a uniform rate, thus producing coils of non-uniform pitch.

One object of my invention is to provide fully automatic apparatus for forming filaments of the above mentioned type which apparatus possesses greatly increased flexibility, as to angular positioning of the filament legs, as compared with that obtainable with apparatus heretofore known.

Another object of my invention is to provide apparatus of the above type which possesses all the necessary flexibility for obtaining any desired angular positioning of the filament legs transversely of the filament coil axis.

Still another object of my invention is to provide apparatus of the above type which, in addition to possessing increased flexibility as to angular positioning of the filament legs, will produce at the same time coils of uniform pitch throughout in all cases.

Figure 2:
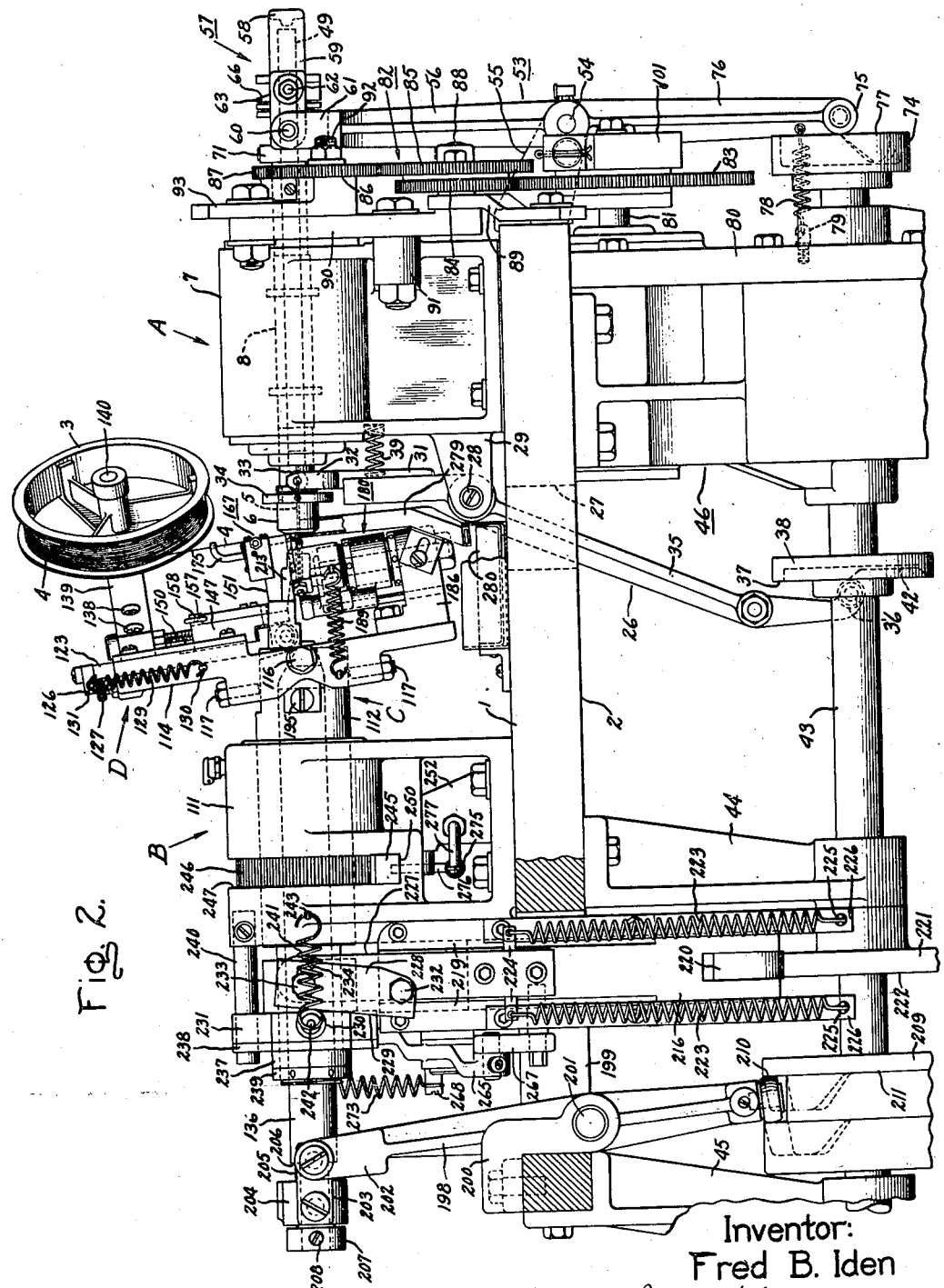
Figure 14:
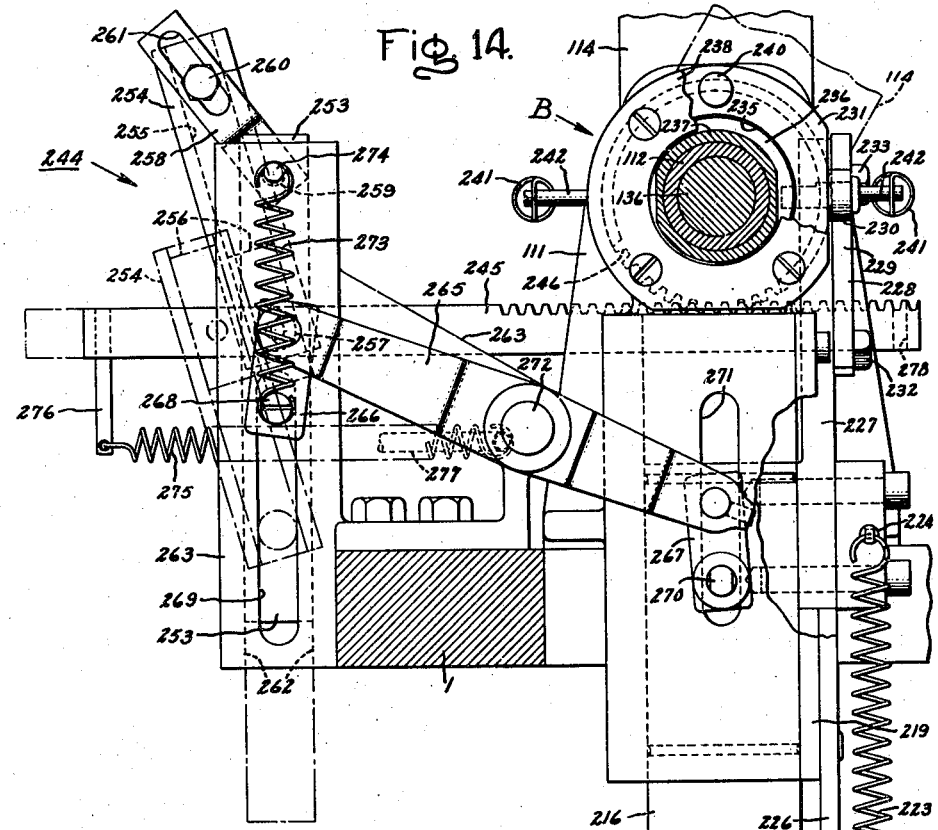
Figure 15:
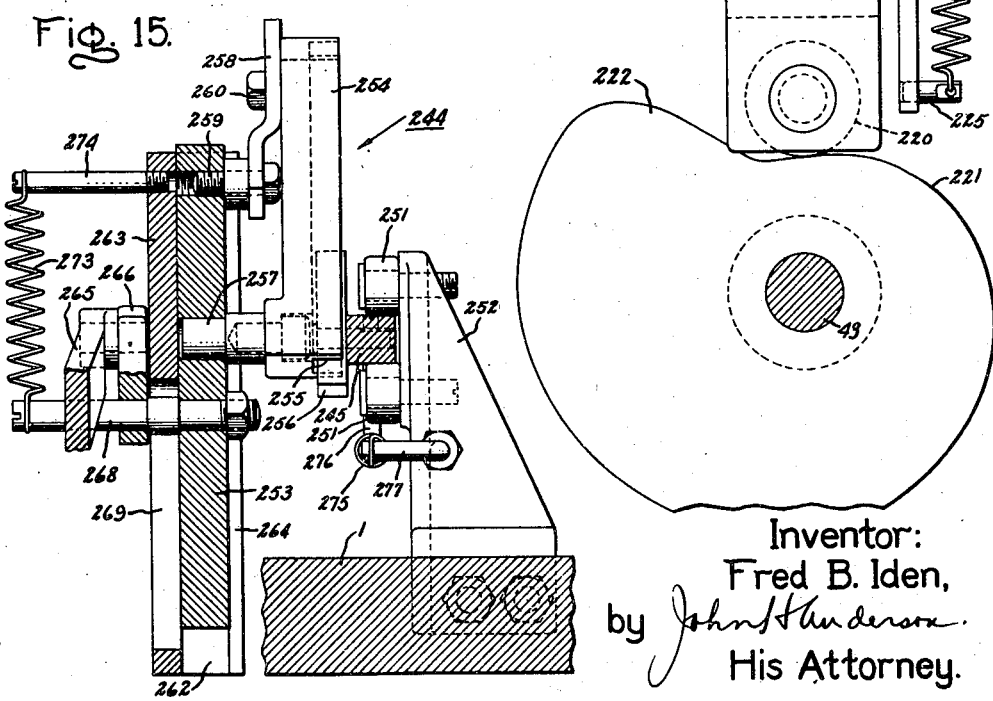

Further objects and advantages of my invention will appear from the following description of a species thereof and from the accompanying drawings in which:

Fig. 1 is a plan view of filament coiling and forming apparatus comprising my invention but with the filament wire feeder head thereof shown in true vertical position for purposes of clarity; Fig. 2 is a fragmentary front elevation of the said apparatus with the table thereof shown partly in section; Fig. 3 is a longitudinal vertical section of the coiling head of the apparatus; Fig. 4 is a vertical section on the line 4—4 of Fig. 3 and showing, in elevation, the gear drive arrangement for the coiling head; Fig. 5 is a longitudinal section, on an enlarged scale, of the forward end of the coiling head spindle with its associated filament wire chuck and mandrel chuck; Fig. 6 is a longitudinal vertical section of the coiling slide head of the apparatus; Fig. 7 is a section on the line 7—7 of Fig. 6; Fig. 8 is a transverse vertical section of the apparatus showing, in elevation, the filament wire feeder head assembly of the coiling slide head, the said wire feeder head being shown in a vertical position, however, for purposes of clarity; Fig. 9 is an elevation, on an enlarged scale, of the filament wire lock and guide die assembly with certain of the parts thereof broken away; Fig. 10 is a section on the line 10—10 of Fig. 9 and showing the filament wire guide die and support on an enlarged scale; Fig. 11 is an enlarged plan view, partly in section, of the wire lock assembly shown in Fig. 9; Fig. 12 is a section on the line 12—12 of Fig. 8; Fig. 13 is a section approximately on the line 13—13 of Fig. 8 and showing in plan the wire cut-off mechanism and the mandrel guide die and support; Fig. 14 is a transverse vertical section on the line 14—14 of Fig. 6 and showing in elevation the fractional turn mechanism for the wire feeder head; Fig. 15 is a vertical section, on the line 15—15 of Fig. 1, further illustrating the said fractional turn mechanism; Figs. 16 to 19 are fragmentary views, on a greatly enlarged scale, showing the successive operations performed by the apparatus comprising my invention in forming a filament; Figs. 16a to 19a are views corresponding to, but at right angles to Figs. 16 to 19; and Figs. 20 and 21 are front and end elevations, respectively, of a filament formed by the apparatus comprising my invention.

Referring to Figs. 1 and 2, the apparatus according to the invention comprises a coiling head A and a coiling slide head B mounted in alignment with one another on a table portion 1 of a base or bed 2. The coiling slide head B comprises a carriage C supporting a filament wire feeder head assembly D which carries a spool or reel 3 of the filament wire 4 which is to be formed into filaments. The filament wire 4 is wound on a mandrel 5 normally projecting from the nose of a filament wire gripper or chuck 6 carried by the coiling head A.

At the start of the filament forming operation, a portion of the free end of the filament wire 4, of sufficient length to form one of the filament end legs, is gripped by the chuck 6 to thereby position and hold the filament wire 4 across and immediately contiguous to the mandrel 5. The chuck 6 and mandrel 5 are then rotated in unison, while the wire feeder head D is simultaneously moved longitudinally of the mandrel 5, to thereby cause the wire 4 to be drawn off the reel 3 and coiled around the mandrel. When the desired number of coil turns have been thus formed, the rotation of the chuck 6 and mandrel 5 and the linear movement of the head D are discontinued, after which the filament wire 4 which is being fed to the mandrel is severed, at the proper distance away from the mandrel, to thereby form the other end leg of the filament. The mandrel 5 is then withdrawn into the chuck 6 to strip the coiled filament from the mandrel and thus permit the filament to fall or drop out of the chuck 6 which theretofore has been opened for such purpose.

As shown more particularly in Figs. 3 to 5, the coiling head A comprises a bearing or housing 7 for a hollow coiling spindle 8 which extends horizontally through the said bearing and is journaled in roller bearings 9 mounted therein. The spindle bearing 7 is bolted or otherwise fastened to the upper side of the table 1 adjacent one end thereof. Mounted on the inner end of the spindle 8 is a gripper or chuck 6 for securely gripping the free end portion of the filament wire 4 on the reel 3. The said chuck 6 is preferably of the combination chuck and mandrel guide type disclosed and claimed in co-pending application Serial No. 608,257, Julius Peterson, filed of even date herewith and comprising inner and outer sleeves 10 and 11, respectively. One end of the inner sleeve 10 projects outwardly beyond the outer sleeve 11 and is threaded into the inner end of the spindle 8. At its other end 12, the inner sleeve 10 is formed with an outwardly extending flange or collar portion 13 providing a bearing shoulder or seat for a compression coil spring 14 fitting over the said sleeve. Carried by the inner sleeve 11 is a combination mandrel guide die and inner jaw member 15 in the form of a headed pin having an axial die opening 16 therethrough for snugly receiving and guiding the mandrel 5. The stem portion 17 of the pin 15 extends into the bore 18 of the inner sleeve 10 and fits snugly therein, while the head portion 19 of the said pin overlies and abuts against the end 12 of the inner sleeve 10. The exposed or outer face 20 of the head portion 19 of the pin 15 is cone-shaped, the angle of the cone corresponding to the angle which the legs of the filament are to bear with respect to the axis of the coiled portion of the filament. The mandrel guide pin 15 and the inner sleeve 10 are rotatively locked together, as by a set screw 21 threaded into the inner sleeve and extending into a keyway 22 in the stem portion 17 of the pin.

At its outer end, the outer sleeve 11 is provided with an inturned annular flange 23 the inner face 24 of which is annularly beveled to correspond to the flattened cone-shaped face 20 of the mandrel guide pin 15. The said flange 23 is normally urged towards the head 19 of the pin 15 by the compressive force of the coil spring 14 which bears at one end against the collar 13 on the inner sleeve 10 and at the other end against a retainer ring 24 disposed within the hollow interior of and secured to the outer sleeve 11, as by set screws. The flange 23 and the head 19 of the mandrel guide pin 15 thus constitute outer and inner jaws which are spring-pressed together to grip and hold the free end portion of the filament wire 4 tightly therebetween. The inner and outer sleeves 10 and 11 are rotatively interlocked, so as to rotate in unison, by a pin 25 received within aligned openings in the said sleeves.

During operation of the apparatus, the chuck 6 is opened to allow insertion of the free end of the filament wire 4 through the central opening 23' of the outer sleeve flange 23 and between the separated gripping surfaces 20, 24 of the chuck, and to subsequently release the said filament wire end portion following the coiling operation. The opening of the chuck 6 is effected by a more or less vertically disposed lever 26 pivotally mounted on the spindle bearing 7 and projecting down through an opening 27 in the table 1. The lever 26 is pivoted intermediate its ends on a pivot pin 28 extending between and carried by a pair of arms 29 extending from the spindle bearing 7. The upper arm 30 of the lever 26 carries an extension 31 which is bifurcated at its upper end to provide spaced arms 32. The said arms span the projecting inner end portion of the coiling spindle 8 and carry pins or studs 33 which are adapted to engage an outwardly extending flange 34 on the outer sleeve 11 upon pivotal movement of the lever 26. The lower arm 35 of the lever 26 carries a roller 36 which is continuously held against the cam edge 37 of a cylindrical cam 38 (Fig. 2) by a compression coil spring 39 compressed between, and extending into wells 40, 41 within the spindle bearing 7 and the upper arm extension 31 of the lever 26. The cam 38 normally holds the lever 26 in an inoperative position, with the pins 33 at the upper end of the lever out of engagement with the flange 34 on the outer sleeve 11, to thereby permit the coil spring 14 in the chuck 6 to close the jaw portions 19 and 23 thereof and thus clamp the filament wire 4 therebetween. The depressed portion 42 of the cam edge 37 allows the coil spring 39 to pivot the lever 26 a sufficient amount to cause the pins 33 at its upper end to engage the flange 34 on the outer sleeve 11 and move the said sleeve forwardly to thereby separate the chuck jaw portions 19 and 23 and thus open the chuck so as to release the filament wire 4 gripped therein and permit re-insertion of the said wire at the start of the next succeeding filament forming cycle. To effect such opening of the chuck 6, it is necessary that the opening force applied to the outer sleeve 11 by the lever 26 and spring 39 be greater than the closing force exerted on the said sleeve 11 by the coil spring 14 within the chuck. The cam 38 controlling the operation of the lever 26 is mounted on a cam shaft 43 located underneath the table 1 and extending parallel to the coiling spindle 8. The said cam shaft is journaled in bearing brackets 44, 45 fastened to and depending from the table 1 and is driven at a uniform rotational speed by the motor-driven gear drive mechanism 46 of the machine.

The mandrel 5, on which the filament wire 4 is coiled, is held in a chuck 47 (Figs. 3 and 5) located within the bore 48 of the coiling spindle 8 and fastened to the inner end of a mandrel rod 49 reciprocable within the said spindle bore 48 and projecting outwardly beyond the outer or rear end of the spindle 8. The mandrel chuck 5 is preferably of the conventional type used in filament coiling machines and comprising two complementary jaw halves 50 which are wedged towards one another, as they are screwed into the mandrel rod 49, to thereby clamp and tightly grip the mandrel 5 therebetween. For this purpose, the jaw halves 50 are provided with tapered or wedge surfaces 51 which engage a corresponding annularly tapered wall portion 52 of the chuck-receiving opening in the mandrel rod 49 to thereby wedge the jaw halves 50 towards each other as they are screwed together into the end of the mandrel rod.

During the operation of the apparatus, the mandrel rod 49 is reciprocated within the spindle 8 to alternately advance the mandrel 5 to its "out" or operative coiling position wherein it projects the proper distance outwardly beyond the nose of the filament wire gripping chuck 6, and then withdraw the mandrel 5 to its "in" or inoperative position within the said chuck 6 to thereby strip the coiled filament from the mandrel. The reciprocating movement of the mandrel rod 49 is imparted thereto by a more or less vertically disposed lever 53 pivotally mounted intermediate its ends, by means of a pivot pin 54, on a bracket 55 bolted or otherwise fastened to the end of the table 1. The upper arm 56 of the lever 53 is connected to the projecting outer or rear end portion of the mandrel rod 49 by pivotal connection means 57 providing quick and easy removal of the mandrel rod, with its associated chuck 47 and mandrel 5, for permitting replacement or ready interchange of different size mandrels.

The pivotal connection means 57 comprises a yoke member 58 the arms 59 of which span the mandrel rod 49 and are pivotally connected, by axially aligned pins 60, to spaced arms 61 at the upper end of the lever arm 56, the said lever arms 61 likewise spanning the mandrel rod 49. In its normal operative position, the yoke 58 is disposed in a more or less horizontal position with its base portion extending around the outer or rear end of the mandrel rod 49 so as to overlie the same and with its arms 59 extending forwardly on opposite sides of the mandrel rod, as shown in Figs. 1 to 3. Intermediate their length the yoke arms 59 are provided with opposed pins or studs 62 projecting inwardly towards one another and engaging with a floating collar 63 on the mandrel rod 49 when the yoke is in its operative position. The said collar 63 is slidable on, as well as rotatable with respect to the mandrel rod 49, the collar being provided with a brushing 64 for such purpose. The rear face of the collar 63 is provided with horizontally extending diametric grooves 65 within which the yoke studs 62 are seated. The upper half of the rear face of collar 63 is tapered forwardly, as indicated at 66, to permit the positioning of the studs 62 within the grooves or seats 65 during assembly. Forward movement of the collar 63, under the influence of the lever 53 and yoke 58, is transmitted to the mandrel rod 49 through a roller bearing 67 interposed between the said collar and a flanged sleeve 68 slidable on the mandrel rod, and thence through a coil spring 69 interposed between the flange 70 on said sleeve and a stop lug 71 suitably fastened to the mandrel rod, as by a set screw 72. To remove the mandrel rod 49 from the coiling spindle 8 for interchange or adjustment of the mandrel 5 carried thereby, it is merely necessary to slide the floating collar 63 forwardly on the mandrel rod, against the resistance of coil spring 69, until the studs 62 are free to be disengaged from their seats 65 by an upward swinging movement of the yoke 58, after which the mandrel rod can be withdrawn entirely from the coiling spindle.

During pivotal movement of the lever 53 to advance the mandrel 5 to its operative or "out" position, the stop lug 71 on the mandrel rod 49 engages the outer end of the coiling spindle 8 to thereby limit the forward or advance movement of the mandrel rod and thus limit the extent of projection of the mandrel outwardly beyond the nose of the gripper chuck 6. The compressive force of the coil spring 69 continuously holds the stop lug 71 against the end of the spindle 8 during the ensuing filament coiling operation so as to insure the maintenance of the mandrel in its correct coiling position during said operation. The return of the mandrel 5 to its inoperative or "in" position within the chuck 6 is effected by the subsequent return pivotal movement of the lever 53, which movement is transmitted to the mandrel rod 49 through the yoke 58, yoke studs 62, and a collar 73 fastened on the mandrel rod outwardly of the yoke studs and engageable thereby upon such return movement of the lever 53. The pivotal movement of the lever 53 to alternately advance and withdraw the mandrel 5 is produced by a cylindrical cam 74 mounted on the cam shaft 43 and engaging a roller 75 on the lower end of the lower arm 76 of said lever 53. The roller 75 is continuously held against the cam edge 77 of the cam 74 by a tension coil spring 78 (Fig. 2) fastened at one end to the lower arm 76 of the lever and at the other end to a hook bolt 79 screwed into the housing 80 of the gear drive mechanism 46.

During operation of the machine, the coiling spindle 8 and mandrel rod 49 (and thus the chuck 6 and mandrel 5 carried thereby) are intermittently rotated in unison, at a uniform speed in the clockwise direction indicated by the arrow in Fig. 4, to thereby wind the desired number of coil turns of the filament wire 4 on the mandrel. The intermittent rotation of the spindle 8 and mandrel rod 49 is produced by the motor-driven gear-drive mechanism 46 which is provided, for such purpose, with an intermittent drive shaft 81 projecting from the gear housing 80 and connected to the spindle 8 through a gear train 82 (Fig. 4) consisting of gears 83, 84, 85, 86 and 87. The drive gear 83 is mounted on the intermittent drive shaft 81 and meshes with gear 84 which is rotatably mounted on a pin 88 extending from brackets 89, 90 adjustably fastened, respectively, to the end of the table 1 and to an arm 91 on the coiling spindle bearing 7. The gear 85 is also rotatably mounted on the pin 88, the said gear being bolted or otherwise rotatively locked to the gear 84 so as to rotate therewith. The gear 85 meshes with the gear 86 which is rotatably mounted on a pin 92 extending from an arm 93 adjustably fastened to the bracket 90. The gear 86 meshes with the gear 87 which is mounted and rotatively locked on the projecting rear end portion of the coiling spindle 8. The coiling spindle gear 87 carries a projecting pin 94 (Fig. 3) which projects into a slot 95 in the mandrel rod stop lug 71 to thereby rotatively drive the mandrel rod 49 in unison with the coiling spindle 8.

As shown in Figs. 3 and 4, the rotational movement of the intermittent drive shaft 81 is transmitted to the drive gear 83 through a spring-cushioned shock-absorber drive arrangement comprising a flanged hub member 96 fastened on a squared portion 97 of the shaft 81, so as to be rotatively locked thereon, by washer 98 and a nut 99 threaded onto the end of the said shaft. The drive gear 83 is rotatably mounted on the sleeve portion 100 of hub 96 and carries a spring housing block 101 suitably fastened to the gear, as by bolts 102, to form a unit therewith. The gear 83 and block 101 are rotatably mounted on the hub sleeve 100 between the washer 98 and the flange 103 on the hub, sufficient clearance being provided therebetween to permit free rotation of the gear and block unit on the hub. Spacer washers 104, preferably of insulating material, are provided between the gear 83 and the block 101 and hub flange 103. A pin 105, carried by the flange 103 of the hub 96 and extending through and spaced from the wall of an opening 106 in the gear 83, projects into a slot 107 in block 101 between opposed spring-cushioned plungers 108 in said slot. The plungers 108 are reciprocably mounted within bores 109 in the block 101 and are continuously pressed against the opposite sides of pin 105 by the compressive force of compression coil springs 110 mounted within the bores 109. At the start and end of rotation of the intermittent drive shaft 81, the torque is transmitted from the said shaft through the hub 96, drive pin 105, and thence through one or the other of the spring-cushioned plungers 108 to the block 101 and the gear 83 fastened thereto. The spring-cushioned plungers 108 thus absorb the shock accompanying the start and the stop of rotation of the drive shaft 81, and so relieve the strain on the gear teeth, drive shaft and other parts of the gear drive mechanism at such times.

Considering now the coiling slide head B and the carriage C which carries the filament wire feeder assembly D, the said head B comprises a bearing or housing 111 for a carriage-supporting sleeve or spindle 112 which extends horizontally through the said bearing in axial alignment with the coiling head spindle 8. The sleeve or spindle 112 is slidable as well as rotatable within bushings 113 in the bearing 111, and it projects outwardly beyond the opposite ends of the bearing. The said bearing 111 is bolted or otherwise fastened to the upper side of the table 1 in spaced relation to the inner end of the coiling head A but in alignment therewith.

At its inner end, the sleeve 112 carries the filament feeder head D which is pivotally mounted on the sleeve for permitting a limited amount of tilting adjustment of the said head on the sleeve. The sleeve 112 and the head D carried thereby together constitute the carriage C of the coiling slide head B. The head D comprises an elongated support standard 114 extending transversely of the sleeve 112 and having a more or less centrally located opening 115 therethrough for receiving the inner end of the sleeve 112. The standard 114 is pivotally mounted intermediate its ends on a pair of pivot screws 116 threaded into opposite sides of the sleeve in diametrically aligned relation with one another. The standard 114 is held in the desired pivotal position on the sleeve 112 by means of a pair of opposed lock screws 117 threaded into a flange 118 bordering the opening 115 in the standard and engaging the upper and under sides of the sleeve. The screws 117 are provided with lock nuts 119 to lock them in their adjusted position. Where the apparatus is to be used to form filaments having end legs inclined relative to the coiled portion, such as illustrated in Figs. 20 and 21, the standard 114 is tilted backwardly, at an angle corresponding to the angular inclination of the said filament legs. Thus, in the particular case illustrated where the legs 120 of the filament 121 (Fig. 20) are inclined at an angle of approximately 8° with respect to the axis of the coiled portion 122, the standard 114 is tilted backwardly on the sleeve 112 at a corresponding angle of approximately 8°.

As shown more particularly in Figs. 6, 8 and 12, the standard 114 carries an elongated slide 123 which is slidable thereon in a direction longitudinally of the standard and radially of the sleeve. The slide 123 is mounted in a slideway formed by ways 124 on the standard 114 and cover plates 125 screwed to the said ways. At its projecting upper end, the slide 123 is provided with a stop lug 126 which is adapted to engage the head portion 127 of a stop screw 128 threaded into the upper end of the standard, to thereby limit the sliding movement of the slide inwardly towards the sleeve 112. The slide 114 is held in its lowered or coiling position, with the stop lug 126 in engagement with the head 127 of stop screw 128, by the pull of a pair of tension coil springs 129 disposed on opposite sides of the standard 114 and connected between posts 130, 131 fastened, respectively, to the standard and to the stop lug 126 on the slide. At its lower end, the slide 123 carries a roller 132 (Fig. 6) disposed between arms 133 on the slide and rotatably mounted on a pin or stud 134 carried by the said arms. During the operation of the apparatus, the roller 132 is engaged by and rides up a rearwardly inclined wedge surface 135 at the forward end of a slide rod 136 reciprocable within the bore 137 of the sleeve 112, thus moving the slide 123 in its ways 124 in a direction outwardly or away from the said sleeve to thereby draw or form the back leg of the filament which has just been coiled on the mandrel 5 as well as the front leg of the next filament to be formed.

Secured to the front face of the slide 123 adjacent its upper end, as by screws 138, is a support arm or bracket 139 which carries the spool 3 of the filament wire 4 to be formed into filaments. The spool 3 is mounted on a pin 140 which is rotatably mounted on the support arm 139 adjacent the free end of said arm. During operation of the apparatus, the spool 3 and its support pin 140 are kept from overrunning by a friction brake device comprising a pair of opposed shoes 141, 142 (Figs. 1 and 8) resiliently clamped against opposite sides of the pin 140. The shoe 141 is held against rotation by a screw 143 threaded into the arm 139 and extending into an aperture 144 in said shoe. The two shoes 141, 142 are resiliently clamped against opposite sides of the pin 140 by a leaf spring 145 which is provided, for such purpose, with screws 146 at its opposite ends which are screwed into the shoe 141 to compress the spring against the back of the shoe 142. A chamois friction surface is preferably provided between the shoes 141, 142 and the pin 140.

Also secured to the front face of the slide 123 and adjustable longitudinally thereof is a subslide 147. The said subslide is fastened to the slide 123 in the desired adjusted position thereon by a pair of screws 148, and is slidably adjustable within longitudinal ways in the slide. To permit such adjustment, the subslide 147 is provided with elongated slots 149 (Fig. 8) for the fastening screws 148. An adjustment screw 150 is preferably provided to enable convenient and accurate adjustment of the subslide 147 in its ways. The said adjustment screw 150 is mounted on the spool support arm 139 and is screwed into the upper end of the subslide 147.

Mounted on the subslide 147 is an L-shaped holder or support bracket 151 for holding a guide die 152 which guides the filament wire 4 from the spool 3 to the mandrel 5. One arm 153 of the holder 151 is pivotally mounted on a pin 154 projecting from the front face of the subslide 147 and it is clamped against the said face of the subslide, in the desired pivotal position thereon, by a screw 155 threaded into the subslide. As shown in Fig. 8, the holder arm 153 is provided with an arcuate slot 156 for the screw 155, concentric with the pivot pin 154, to permit a limited amount of pivotal adjustment of the holder 151 on the subslide 147 to thereby set the filament wire guide die 152 in proper wire-guiding position. A pair of opposed adjustment screws 157 are preferably provided for the purpose of enabling convenient and accurate pivotal adjustment of the holder 151 on pivot pin 154. The said adjustment screws 157 are screwed inwardly into lugs 158 on the subslide 147 and engage opposite sides of the holder arm 153 which extends between the said lugs. The other arm 159 of the holder 151 projects outwardly away from the front face of the subslide 147 and carries the filament wire guide die 152 at its outer or free end.

As shown more particularly in Figs. 9 and 10, the wire guide die 152 comprises a cylindrical inner member or rod 160 having a longitudinal wire-receiving groove 161 in its outer surface, and an outer sleeve 162 surrounding and secured to the inner rod or core 160, as by soldering. The filament wire 4 is threaded through and guided in the longitudinal passageway 161 thus formed by the assembled core 160 and sleeve 162. The holder arm 159 is slotted at its outer end, as indicated at 163, to provide a pair of clamp arms or jaws 164 between which the wire guide die 152 is clamped. For this purpose, the inner or facing surfaces of the holder jaws 164 are formed with seat or socket portions 165 for receiving the wire guide die 152. The jaws 164 are clamped against the guide die 152 by a clamping screw 166 extending through one of the jaws and screwed into the other one of said jaws. The wire guide die 152 is adjusted to a position such that its lower end is located as close as possible to the mandrel 5 during the coiling operation and guides the filament wire 5 to the mandrel immediately contiguous the back side thereof, as shown in Fig. 8.

Mounted on the upper side of the holder arm 159 at the outer or free end thereof is a filament wire lock device 167 which prevents pull-back of the filament wire 4 due to the uncoiling thereof on the spool 3 upon cut-off of the wire following the filament coiling operation. The prevention of such pull-back of the wire 4 thus insures the formation of uniform length front legs on the filaments successively formed by the apparatus. As shown more particularly in Figs. 6, 9 and 11, the wire lock device 167 comprises a block-shaped body or housing 168 one side face of which is provided with a recess 169 including a groove portion 170. The filament wire 4 is fed through the groove 170 between stationary and pivotally movable inserts 171, 172, respectively, located within the recess 169. The wire 4, when not being drawn downwardly through the groove 170, is wedged and firmly held between the inserts 171, 172 by the force of a torsion spring 173 acting on the movable insert 172. The wire 4, however, is free to be drawn downwardly through the groove 170 against the resistance of the spring 173, the downward pull of the wire pivoting the insert 172 against the resistance of spring 173 an amount sufficient to relieve the wedging pressure against the wire and thus permit its free passage between the inserts 171, 172. The spring 173, inserts 171, 172, and the filament wire 4, are all held within the recess 169 in block 168 by a cover plate 174 screwed or otherwise fastened to the block. The wire 4 is guided into the groove 170 in block 168 by a suitable guide 175 preferably in the form of an upstanding rod fastened to the block within an opening therein, as by screw 176, and having a laterally extending portion 177 provided with an eyelet or guide opening 178 aligned with the groove 170 and through which the filament wire 4 is threaded. To permit complete withdrawal of the filament wire 4 from the wire lock device 167, and to also permit ready insertion of the filament wire through the said device during the loading of the apparatus, a wire spring release finger 179 is provided on the block 168 which may be pressed down into engagement with the movable insert 172 to thereby disengage the said insert from the wire 4 and thus completely remove the wedging pressure of the said insert against the wire.

In accordance with the invention, the wire feeder head D is provided with wire cut-off means 180 for severing the filament wire 4 at a point between the mandrel 5 and the wire guide die 162 following each successive filament coiling operation, such wire cut-off thus serving to form the back leg of the filament and to separate the completed filament from the remainder of the filament wire on the spool 3. By so mounting the cut-off means 180 right on the head D, the said cut-off means will accordingly remain in fixed relation to the portion of the filament wire 4 extending between the spool 3 and the mandrel 5 during any and all pivotal movement of the head D about the mandrel axis. As a result, the filament wire 4 between the spool 3 and mandrel 5 is always located within the effective cutting range or field of the knives of the cut-off mechanism regardless of the amount of pivotal movement of the carriage C during the coiling of the filament wire on the mandrel. There is, accordingly, no limitation placed on the extent of rotation of the carriage C by the cutting range of the cut-off mechanism, as there formerly was with the prior art machines.

As shown more particularly in Figs. 6, 8 and 13, the cutter mechanism 180 comprises a pair of knives 181, 182 adjustably mounted on separate holders or arms 183 and 184, respectively. The cutter arms 183, 184 are pivotally mounted on a common upstanding pivot pin 185 extending from a bracket 186 adjustably fastened to the lower end of the standard 114. The pivot pin 185 extends longitudinally of the standard 114 with its axis intersecting the axis of the sleeve 112. The cutter knives 181, 182 are normally held in an open position as shown in Fig. 13, with the side faces 187 of the cutter arms in engagement with an upstanding stop pin 188 extending from bracket 186, by the pull of tension coil springs 189 connected between posts 190 on the cutter arms and posts 191 on the standard 114. In such open position of the cutter knives 181, 182, their cutting edges 192 are separated a sufficient distance to permit the entry therebetween of the filament wire guide die 152, as shown in Fig. 8.

During the operation of the apparatus, the cutter arms or holders 183, 184 are rotated on the pivot pin 185, immediately following the drawing of the back leg of the filament coiled on the mandrel 5, to thereby move the cutter knives 181, 182 to their closed or cutting position whereby the said knives shear or sever the filament wire 4 at the proper distance away from the mandrel 5 to form the back leg of the filament. The rotation of the cutter arms 183, 184 to close the knives 181, 182 is effected by the slide rod cam 136 reciprocating within the sleeve 112. For such purpose, the opposite sides of the slide rod 136 are tapered inwardly towards the forward end or nose of the rod to thereby provide a pair of side wedge surfaces 193 which engage rollers 194 on the cutter arms during the forward or advance movement of the rod within the sleeve 112. To maintain the side wedge surfaces 193 as well as the top wedge surface 135 of the slide rod 136 in fixed angular relation with their cooperating rollers 194 and 132, respectively, during any and all pivotal movement of the sleeve 112 and head D in the bearing 111, the rod 136 is rotatively locked with the said sleeve as by a set screw 195 (Fig. 13) threaded into the sleeve and provided with an inwardly projecting key portion 196 fitting and slidable within a longitudinally extending keyway or groove 197 in the rod.

The reciprocating movement of the slide rod cam 136 within sleeve 112 to actuate the cutter mechanism 180 and slide 123 is produced by a more or less vertically disposed lever 198 (Figs. 1, 2 and 6) located outwardly of the outer end of the bearing 111 and extending down through an opening 199 in the table 1. The said lever is pivotally mounted intermediate its ends on a bracket 200 fastened to the table 1, the lever being provided for such purpose with a pivot pin 201 which is journaled in the bracket. The upper end of the lever 198 is formed with spaced arms 202 which span the projecting rear end portion of the slide rod 136 and are pivotally connected by links 203 to a collar or coupling 204 mounted on the said rod. The coupling 204 is adjustable longitudinally of the slide rod 136 to thereby provide adjustment of the rod longitudinally within the sleeve 112 so as to insure properly timed actuation of the cutter mechanism 180 and the spool carrying slide 123 by said rod. For such purpose, the coupling 204 is screwed onto a threaded sleeve or bushing 205 rotatably mounted on the slide rod 136 but longitudinally fixed thereon between a shoulder 206 on the rod and a retaining collar 207 fastened to the rod, as by a set screw 208. The pivotal movement of the lever 198 to effect the reciprocation of the slide rod 136 within the sleeve 112 is produced by a cylindrical or barrel type cam 209 mounted on the cam shaft 43, the lower end of the lever carrying a roller 210 which rides within the cam groove or track 211 of said cam.

In addition to carrying the head D, the coiling slide sleeve 112 also carries means for guiding and supporting the free or exposed end of the mandrel 5 during the filament coiling operation, the said guiding means comprising a tubular mandrel-receiving die member 212 adjustably mounted in a U-shaped holder 213 bolted to and projecting longitudinally from the forward end of the sleeve 112. The forward end of the mandrel receiving opening 214 in the die 212 is flared outwardly, as indicated at 215 in Fig. 16, in order to properly guide the mandrel into the said opening each time the mandrel is advanced to its coil winding position during the operation of the apparatus. The mandrel guide die 212 is set in a position as close as possible to the lower end of the filament wire guide die 152.

During the operation of the apparatus, the coiling slide sleeve 112 is reciprocated within the bearing 111 by suitable slide actuating mechanism to thereby move the carriage C longitudinally of the mandrel 5 first at a uniform rate away from the wire gripping chuck 6 so as to space the successive turns of the filament wire 4 a uniform distance apart on the mandrel, and thence to return the head D to its original or starting position. The said slide actuating mechanism comprises a slide 216 which is vertically reciprocable in ways 217, 218 (Figs. 6 and 7) on the coiling slide bearing 111, the ways projecting down through the opening 199 in the table 1. The slide 216 is held within the ways 217, 218 by cover plates 219 bolted or otherwise fastened to the ways. At its lower end, the slide 216 carries a roller 220 which rides on the periphery or cam surface 221 of disc cam 222 mounted on the cam shaft 43. The slide roller 220 is continuously held down in engagement with the cam surface 221 by the pull of a pair of vertically disposed tension coil springs 223 connected between posts 224 carried by the slide and other posts 225 fastened to the lower end of vertically extending bars or arms 226 screwed or otherwise secured to the ways 217, 218. At its upper end, the slide 216 carries a side extension arm 227 which extends upwardly along side the coiling slide sleeve 112. Adjustably mounted on the upper end of the extension arm 227 is a bar or plate cam 228 providing a forwardly inclined cam surface 229 which engages a roller 230 carried by a collar or sleeve 231 rotatably mounted on but fixed longitudinally of the coiling slide sleeve 112. The bar cam 228 is pivotally mounted on a pivot screw 232 threaded into the extension arm 227, and is held in the desired pivotal position by a fastening screw 233 likewise threaded into the arm 227. To permit pivotal adjustment of the bar cam 228 on its pivot screw 232, an arcuately elongated slot 234 (Fig. 2) concentric with the pivot screw 232 is provided in the cam 228 for the fastening screw 233. The angle from the vertical to which this bar cam 228 is set determines the amount of movement imparted to the coiling slide sleeve 112, thus providing a convenient and accurate means of obtaining any desired uniformly constant movement of the sleeve 112.

As shown more particularly in Fig. 6, the outer face of the collar 231 is provided with an annular recess 235, bordering the central opening of the collar, for receiving the flanged end 236 of an adjustment nut 237 threaded onto the coiling slide sleeve 112. The said flanged end 236 of the nut 237 is held within the annular recess 235 by a cover or retainer ring 238 screwed to the outer face of the collar 231. Just enough clearance is provided for the flanged end 236 of the nut 237 to permit the latter to rotate freely within the annular recess 235 while holding the collar 231 in a fixed position longitudinally of the coiling slide sleeve 112. The adjustment nut 237 is locked in a fixed position on the sleeve 112 by a lock nut 239 threaded on said sleeve. To maintain the roller 230 on collar 231 in proper cam-engaging position during any and all rotational movements of the sleeve 112 in bearing 111, the said collar 231 is suitably locked against rotation with the sleeve 112, as by means of a pin 240 extending outwardly from the outer end of the bearing 111 and slidably fitting within aligned openings in the collar 231 and cover ring 238. The roller 230 is continuously held in engagement with the inclined cam surface 229 of cam 228 by the pull of a pair of horizontally disposed tension coil springs 241 located on opposite sides of the coiling slide sleeve 112 and connected between posts 242 carried by the collar 231 and other posts 243 fastened to the bearing 111.

During the operation of the apparatus, the slide 216 and the bar cam 228 carried thereby are raised at a uniform rate by the cam 222 simultaneously with the rotation of the mandrel 5 and chuck 6. The upward movement of the slide 216 and cam 228 causes the roller 230 on collar 231 to ride up the inclined cam surface 229 of the cam 228 and thus draw the coiling slide sleeve 112 backwardly at a uniform rate in its bearing 111. The uniform backward or retracting movement of the sleeve 112 and its associated head D, simultaneously with the unitary rotation of the mandrel 5 and chuck 6 at a uniform speed, thus causes the filament wire 4 to be fed to and coiled on the mandrel with a uniform spacing or pitch between the turns of the coil. Following the pulling or drawing of the back leg of the filament and the cut-off of the filament wire 4 by the cutter mechanism 180, the drop of cam 222 allows the slide 216 to be lowered by the action of springs 223, and the roller 230 to ride down the inclined track 229 of cam 228 under the influence of the springs 241, thus advancing the sleeve 112 in its bearing 111 and returning the head D to its original forward or starting position.

Immediately following the coiling of the filament wire 4 around the mandrel 5, but before the cut-off of the said wire by the cutter mechanism 180, the gripper chuck 6 is opened by the lever 26 to thereby release the front leg of the filament. Upon such release, the coiled portion of the filament uncoils a certain amount on the mandrel due to the inherent springy character of the filament wire 4. The amount of such uncoiling, and therefore the final angular placement of the filament legs transversely of the coil axis, depends upon the springiness characteristic of the particular filament wire 4 being processed, which characteristic is apt to vary considerably from one spool of wire to the next. To compensate for such differences in wire springiness so as to enable the production of filaments with uniform leg placement, means are provided for pivoting the carriage C a limited amount in either direction about the mandrel axis during the coiling operation to thereby add or subtract a fraction of a turn from the coil portion of the filament, as may be required.

In accordance with the invention, the said carriage pivoting or swinging means, indicated by the reference numeral 244, is so constructed as to cause the pivotal movement of the carriage C, through its predetermined angle, to proceed at a uniform rate and to be coextensive in time with the coiling of the filament wire 4 around the mandrel 5. In this way, the change in pitch of the filament coil occasioned by such carriage pivoting is distributed uniformly throughout the entire length of the filament coil, thus insuring a uniform pitch for the coil.

Referring more particularly to Figs. 1, 6, 14 and 15, the carriage pivoting means 244 according to the invention comprises a horizontally reciprocable rack 245 extending transversely of the coiling slide sleeve 112 and meshing with a spur gear 246 on said sleeve. The gear 246 is rotatable within a transverse slot 247 in the coiling slide bearing 111 and is keyed to the sleeve 112 by a key 248 fitting in a groove or keyway 249 in the sleeve. The rack 245 extends into the slot 247 in a position beneath the gear 246, and it is supported on the bottom wall 250 of said slot. The rack 245 is additionally supported, outwardly of the bearing 111, between a pair of rollers 251 engaging the upper and under sides of the rack, the portion of the rack riding between the rollers 251 being devoid of teeth. The support rollers 251 are rotatably mounted on an upstanding bracket 252 secured to the table 1.

The rack 245 is reciprocated horizontally within the slot 247, to thereby rotate the gear 246 and sleeve 112, by means of a vertically reciprocable slide 253 carrying an elongated bar or cam 254. The bar 254 is provided with a longitudinal guideway 255 within which slides a shoe or cam follower 256 pivotally mounted on the rack 245. To effect movement of the rack 245, the bar 254 is inclined one way or the other relative to the vertical as required, the direction and degree of tilt of the bar controlling the direction and amount of movement of the rack 245 and the sleeve 112. The bar 254 is pivotally connected at its lower end to the slide 253 by means of a pin 257, and it is rigidly held in the desired pivotal position (true vertical or inclined) relative to the slide by a brace 258 pivotally connected to the upper end of the slide by a pivot screw 259. The brace 258 is clamped to the bar 254 by a bolt 260, and it is provided with an elongated slot 261 for the bolt 260 to thereby permit adjustment of the bar 254 to the desired inclined position, if pivotal movement of the carriage C is required by the springiness characteristic of the filament wire 4. Obviously, if no pivotal movement of the carriage C is necessary, then the bar 254 is set in a true vertical position, in which case the shoe or follower 256 and therefore the rack 245 undergo no lateral displacement during the vertical reciprocation of the slide 253 and the bar or cam 254 carried thereby.

The cam slide 253 is slidably mounted in a vertically extending guideway formed by ways 262 in a bracket 263 fastened to the table 1. The cam slide 253 is retained within the ways 262 by cover plates 264 screwed to the said ways. The vertical reciprocation of the cam slide 253 in its guideway, to thereby reciprocate the rack 245 and oscillate the sleeve 112 and head D forming the carriage C, is produced by a more or less horizontally disposed lever 265 one end of which is pivotally connected by link 266 to the cam slide 253 and the other end of which is pivotally connected by link 267 to the slide 216 which controls the sliding movement of the sleeve 112 in the bearing 111. The link 266 is pivotally connected to the slide 253 by a pin 268 fastened to the said slide and projecting through a vertically elongated slot 269 in the bracket 263. Similarly, link 267 is pivotally connected to the slide 216 by a pin 270 screwed into the said slide and projecting through a vertically elongated slot 271 in the way 217 of the coiling slide bearing 111. The lever 265 is pivotally mounted intermediate its end on a pivot pin 272 (Fig. 14) extending from the bracket 263. To assist the return of the slide 253 to its uppermost or starting position, a vertically disposed tension coil spring 273 is connected between the pivot pin 268 carried by the slide and a post 274 extending from the bracket 263. Likewise, to assist the return of the rack 245 to its starting position, a horizontally extending tension coil spring 275 is connected between a post 276 carried by the rack and a post 277 extending from a bracket 252. Where the bar or cam 254 is set in a position inclined the opposite direction from that shown in the drawings so as to thereby cause movement of the rack 245 and swiveling of the carriage D in the opposite direction from that illustrated, the spring post 276 is removed from the back end of the rack 245 and screwed into a threaded socket 278 at the front end of the rack, and the spring 275 then turned around and connected between the post 277 and the re-positioned post 276.

During operation of the apparatus, the upward movement of slide 216 during the coiling interval simultaneously retracts the sleeve 112 and pivots the lever 265, thus causing the slide 253 and the inclined bar or cam 254 carried thereby to be moved downwardly at a uniform rate to their lowermost position, as indicated in dash-dot lines in Fig. 14. The downward movement of the bar 254 causes the shoe or follower 256, riding in the inclined guideway or cam track 255 of the bar, to be displaced laterally one way or the other from its starting position depending on the setting of the bar, as shown in dash-dot lines in Fig. 14. The shoe, carrying the rack 245 along with it, thus moves the rack linearly so as to rotate the gear 246, sleeve 112 and head D, the direction and amount of lateral movement of the shoe and rack and pivotal movement of the sleeve and head D depending on the direction and amount of tilt of the bar 254. In the particular case illustrated in the drawings, the bar 254 is tilted backwardly, thus causing the rack 245 to be drawn backwardly (to the left as viewed in Fig. 14) and the sleeve 112 and head D forming the carriage C to be pivoted clockwise during the coiling interval, as shown in dash-dot lines, whereby a fraction of a turn is added to the coiled filament on the mandrel 5. The subsequent downward movement of the slide 216, following the coiling operation and cut-off of the filament leg, returns the rack 245 and the sleeve 112 and head D to their original starting position preparatory to the start of the next coiling cycle.

Since the filament wire cut-off mechanism 180 is mounted right on the head D, the filament wire 4 is within effective cutting range of the said mechanism at all times, regardless of the extent of pivotal movement of the carriage C. Thus, the cutting range of the cutter mechanism 180 places no limitation on the amount of pivotal movement of the carriage C, so that the machine could be designed to permit a full revolution of the carriage C, if desired. However, the use of the ring-type gripper chuck 6 described and claimed in the above - mentioned co-pending application Serial No. 608,257, which chuck will grip the filament wire at any point on a full 360° circle, makes it unnecessary to provide for more than one-quarter or so revolution of the carriage C in either direction from a true vertical position. Such a range of rotational movement of the carriage C, together with the ring-type gripper chuck 6, is sufficient to fully compensate for any and all differences in the springiness characteristic of the filament wire 4 which may be encountered. In addition, with such a combination it is possible to form coiled filaments with any desired angular position of the end legs with respect to one another transversely of the coil axis.

Upon completion of the filament, it is stripped off the mandrel 5 by the retraction of the latter into the nose of the chuck 6. The filament is then free to drop out of the chuck 6 of its own weight. If desired, however, a jet of air may be directed against the filament to blow it out of the chuck 6. The filament drops out of the chuck 6 into a chute 279 carried by the head D which then guides the filament into an inspection tray 280 mounted on the table 1.

Figs. 16 to 19, and corresponding Figs. 16a to 19a, illustrate the successive steps performed by the apparatus in forming a filament. As shown in Figs. 16 and 16a, the portion 120 of the filament wire projecting from the wire guide die 152 is first inserted in the open chuck 6 in a position adjacent and behind the mandrel 5, and the chuck then closed by the action of the chuck spring 14 to thereby firmly grip the said wire portion 120. The chuck 6 and mandrel 5 are then rotated in unison, by the gear drive mechanism 46 acting through the gear train 82, to thereby draw and wind the filament wire 4 around the mandrel 5. Simultaneously with such rotation of the chuck 6 and mandrel 5 the carriage C is retracted in the bearing 111 by the upward movement of slide 216 to thereby space the turns of the filament wire 4 on the mandrel so as to cause the wire to be coiled with a uniform pitch thereon, as shown in Fig. 17. Also, if required by the springiness characteristic of the particular filament wire 4 being processed, the carriage C is swung (by the carriage pivoting means 244) the required amount one way or the other about the mandrel axis during the coiling operation (Fig. 17a) to add or subtract the fraction of a turn necessary to insure proper final placement of the legs of the filament. Upon completion of the coiling operation, the wire guide die 152 is moved laterally away from the mandrel 5, by the advance movement and engagement of the rod cam 136 with the slide 123 carrying the wire guide die, to thereby draw the back leg portion 120 of the filament as well as the front leg of the next filament to be formed, as shown in Figs. 18 and 18a. The chuck 6 is then opened by the operating lever 26 to release the front leg of the filament, thus permitting the coiled portion 122 of the filament to uncoil on the mandrel, as shown in Figs. 19 and 19a. The cutter mechanism 180 is then actuated by the advancing rod cam 136 to sever the filament wire 4, as shown in Figs. 19 and 19a, and thus separate the filament on the mandrel from the remainder of the filament wire on the spool 3. The mandrel 5 is then retracted into the nose of the chuck 6, by the action of the lever 53, to thereby strip the completed filament from the mandrel, whereupon the filament drops of its own weight out of the opened chuck 6 into the chute 279 which then guides it into the tray 280. The carriage C and mandrel 5 are then returned to their original or starting positions preparatory to the start of the next filament forming cycle.

What I claim as new and desire to secure by Letters Patent of the United States is:

1. In filament coiling apparatus of the type comprising a mandrel on which the filament wire is coiled, filament wire gripper means adapted to hold an end of the filament wire adjacent and across the mandrel and rotatable as a unit with the mandrel about the mandrel axis to coil the filament wire around the mandrel, and a carriage movable longitudinally of and pivotable about the mandrel axis and carrying means for guiding the filament wire transversely to the mandrel, the combination of cutter means mounted directly on said carriage and operable upon completion of the longitudinal movement of said carriage to sever the portion of the filament wire extending between the mandrel and the guide means for said wire.

2. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage having an elongated hollow support member and provided with means for guiding the filament wire transversely to the mandrel, said carriage being movable longitudinally of the mandrel to space the coil turns, cutter means mounted directly on said carriage and operable to sever the portion of the filament wire extending between the mandrel and the guide means for said wire, and an actuating rod slidable within said hollow support member to actuate said cutter means upon completion of the longitudinal movement of said carriage.

3. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage having a hollow support slide and provided with means for guiding the filament wire transversely to the mandrel, cutter means mounted directly on said carriage and operable to sever the portion of the filament wire extending between the mandrel and the guide means for said wire, means for actuating the carriage support slide to move the carriage longitudinally of the mandrel during the coiling interval, and an actuating rod slidable within and independently of the carriage support slide to actuate said cutter means upon completion of the longitudinal movement of said carriage.

4. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage having a support spindle and provided with means for guiding the filament wire transversely to the mandrel, cutter means mounted directly on said carriage and operable to sever the portion of the filament wire extending between the mandrel and the guide means for said wire, means for pivoting the carriage on its spindle through a predetermined angle about the mandrel axis, and an actuating slide carried by and movable longitudinally of said spindle to actuate said cutter means upon completion of the pivotal movement of said carriage.

5. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage having a hollow support spindle and provided with means for guiding the filament wire transversely to the mandrel, cutter means mounted directly on said carriage and operable to sever the portion of the filament wire extending between the mandrel and the guide means for said wire, means for pivoting the carriage on its spindle through a predetermined angle about the mandrel axis, and an actuating rod slidable within the hollow spindle to actuate said cutter means upon completion of the pivotal movement of said carriage.

6. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage having a hollow support spindle and provided with means for guiding the filament wire transversely to the mandrel, cutter means mounted directly on said carriage and operable to sever the portion of the filament wire extending between the mandrel and the guide means for said wire, means for sliding the carriage support spindle longitudinally to thereby move the carriage longitudinally of the mandrel, means for pivoting the carriage on its spindle through a predetermined angle about the mandrel axis, and an actuating slide rotatively locked with said spindle and slidable longitudinally therein to actuate said cutter means.

7. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage comprising an elongated hollow support member and a slide movable transversely of the mandrel and carrying means for guiding the filament wire transversely to said mandrel, cutter means mounted directly on said carriage and operable to sever the portion of the filament wire extending between the mandrel and the guide means for said wire, and an actuating rod slidable within said hollow support member to actuate both said slide and said cutter means.

8. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage comprising a hollow support spindle rotatable about the mandrel axis and a slide movable transversely of the mandrel and carrying means for guiding the filament wire transversely to said mandrel, cutter means mounted directly on said carriage and operable to sever the portion of the filament wire extending between the mandrel and the guide means for said wire, means for pivoting the carriage on its spindle through a predetermined angle about the mandrel axis, and an actuating rod rotatively locked with said spindle and slidable longitudinally therein to actuate both said slide and said cutter means.

9. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage comprising a support sleeve rotatable about the mandrel axis, a standard carried by and extending transversely of said sleeve, said standard being tiltably adjustable on said sleeve, a slide carried by said standard and slidable longitudinally thereof, guide means carried by said slide for guiding the filament wire transversely to the mandrel, and a pair of cutter knives pivotable on said standard to sever the portion of the filament wire extending between the mandrel and the guide means for said wire, means for pivoting the carriage on its support sleeve through a predetermined angle about the mandrel axis, and an actuating rod rotatively locked with said sleeve and slidable longitudinally therein to actuate said slide and pivot said cutter knives.

10. In filament coiling apparatus of the type comprising a mandrel on which the filament wire is coiled, filament wire gripper means adapted to hold an end of the filament wire adjacent and across the mandrel, means for rotating the mandrel and gripper means in unison and at a uniform speed about the mandrel axis to coil the filament wire around the mandrel, a carriage pivotable about the mandrel axis and having means for guiding the filament wire transversely to the mandrel, and means for moving the carriage longitudinally of the mandrel at a uniform rate throughout the coiling interval to advance the wire along the mandrel and uniformly space the turns of the wire as it is being coiled, the combination of means connected to said carriage for pivoting it through a predetermined angle about the mandrel axis and at a uniform rate throughout the coiling interval.

11. In filament coiling apparatus of the type comprising a mandrel on which the filament wire is coiled, filament wire gripper means adapted to hold an end of the filament wire adjacent and across the mandrel, means for rotating the mandrel and gripper means in unison and at a uniform speed about the mandrel axis to coil the filament wire around the mandrel, a carriage pivotable about the mandrel axis and having means for guiding the filament wire transversely to the mandrel, and means for moving the carriage longitudinally of the mandrel at a uniform rate throughout the coiling interval to advance the wire along the mandrel and uniformly space the turns of the wire as it is being coiled, the combination of means connected to said carriage and adjustable to effect pivotal movement of the carriage through a predetermined angle in either direction about the mandrel axis and at a uniform rate throughout the coiling interval to thereby add or subtract a fraction of a turn from the coiled wire on the mandrel.

12. In filament coiling apparatus of the type comprising a mandrel on which the filament wire is coiled, filament wire gripper means adapted to hold an end of the filament wire adjacent and across the mandrel, means for rotating the mandrel and gripper means in unison and at a uniform speed about the mandrel axis to coil the filament wire around the mandrel, a carriage pivotable about the mandrel axis and having means for guiding the filament wire transversely to the mandrel, and means for moving the carriage longitudinally of the mandrel at a uniform rate throughout the coiling interval to advance the wire along the mandrel and uniformly space the turns of the wire as it is being coiled, the combination of means comprising a gear on said carriage and a rack meshing therewith for pivoting the carriage through a predetermined angle about the mandrel axis and at a uniform rate throughout the coiling interval.

13. In filament coiling apparatus of the type comprising a mandrel on which the filament wire is coiled, filament wire gripper means adapted to hold an end of the filament wire adjacent and across the mandrel, and means for rotating the mandrel and gripper means in unison and at a uniform speed about the mandrel axis to coil the filament wire around the mandrel, the combination of a carriage having a support spindle rotatable about the mandrel axis, said carriage being provided with means for guiding the filament wire transversely to the mandrel, means for moving the carriage longitudinally of the mandrel at a uniform rate throughout the coiling interval to advance the wire along the mandrel and uniformly space the turns of the wire as it is being coiled, and means comprising a gear on said spindle and a rack meshing therewith for pivoting the carriage through a predetermined angle about the mandrel axis and at a uniform rate throughout the coiling interval.

14. In filament coiling apparatus of the type comprising a mandrel on which the filament wire is coiled, filament wire gripper means adapted to hold an end of the filament wire adjacent and across the mandrel, and means for rotating the mandrel and gripper means in unison and at a uniform speed about the mandrel axis to coil the filament wire around the mandrel, the combination of a carriage having a support spindle rotatable about the mandrel axis, said carriage being provided with means for guiding the filament wire transversely to the mandrel, means including a slide member for moving the carriage longitudinally of the mandrel at a uniform rate throughout the coiling interval to advance the wire along the mandrel and uniformly space the turns of the wire as it is being coiled, and means comprising a gear on said spindle and a rack meshing therewith and actuated by said slide member for pivoting the carriage through a predetermined angle about the mandrel axis and at a uniform rate throughout the coiling interval.

15. In filament coiling apparatus of the type comprising a mandrel of which the filament wire is coiled, filament wire gripper means adapted to hold an end of the filament wire adjacent and across the mandrel, and means for rotating the mandrel and gripper means in unison and at a uniform speed about the mandrel axis to coil the filament wire around the mandrel, the combination of a carriage having a support spindle and provided with means for guiding the filament wire transversely to the mandrel, means for moving the carriage longitudinally of the mandrel at a uniform rate throughout the coiling interval to advance the wire along the mandrel and uniformly space the turns of the wire as it is being coiled, and means for pivoting the carriage through a predetermined angle about the mandrel axis and at a uniform rate throughout the coiling interval, the carriage pivoting means comprising a gear on said spindle, a rack meshing with said gear, a cam slide movable transversely of said rack and provided with a cam track, and a cam follower mounted on said rack and riding along said cam track to thereby move said rack linearly.

16. In filament coiling apparatus of the type comprising a mandrel on which the filament wire is coiled, filament wire gripper means adapted to hold an end of the filament wire adjacent and across the mandrel, and means for rotating the mandrel and gripper means in unison and at a uniform speed about the mandrel axis to coil the filament wire around the mandrel, the combination of a carriage having a support spindle and provided with means for guiding the filament wire transversely to the mandrel, means including a slide member for moving the carriage longitudinally of the mandrel at a uniform rate throughout the coiling interval to advance the wire along the mandrel and uniformly space the turns of the wire as it is being coiled, and means for pivoting the carriage through a predetermined angle about the mandrel axis and at a uniform rate throughout the coiling interval, the carriage pivoting means comprising a gear on said spindle, a rack meshing with said gear, a cam slide movable transversely of said rack by said slide member and provided with a cam track, and a cam follower mounted on said rack and riding along said cam track to thereby move said rack linearly.

17. Apparatus for forming filamentary wire into coiled lamp filaments comprising a coiling head provided with a mandrel on which the filament wire is coiled and gripper means for holding an end of said wire adjacent and across the mandrel, means for rotating the mandrel and gripper means in unison about the mandrel axis to cause the filament wire to be coiled around the mandrel, a carriage mounted adjacent said coiling head and carrying means for guiding the filament wire transversely to the mandrel, means for moving the carriage longitudinally of the mandrel in a direction away from the coiling head and at a predetermined rate with respect to the rotation of the mandrel and gripper means for advancing the filament wire along the mandrel to space the turns of the said wire as it is being coiled, means adjustable to effect pivotal movement of the carriage through a predetermined angle in either direction about the mandrel axis and at a predetermined rate with respect to and coextensive with the rotation of the mandrel and gripper means to thereby add or subtract a fraction of a turn from the coiled wire on the mandrel, and cutter means mounted directly on said carriage for severing the portion of the filament wire extending between the mandrel and the guide means for said wire.

18. Apparatus for forming filamentary wire into coiled lamp filaments comprising a coiling head provided with a mandrel on which the filament wire is coiled and a ring-type chuck concentrically surrounding the mandrel, said chuck being arranged to grip, at any point therearound, an end of the filament wire to thereby hold it adjacent and across the mandrel, means for rotating the mandrel and chuck in unison about the mandrel axis to cause the filament wire to be coiled around the mandrel, a carriage mounted adjacent said coiling head and carrying means for guiding the filament wire transversely to the mandrel, means for moving the carriage longitudinally of the mandrel in a direction away from the coiling head and at a predetermined rate with respect to the rotation of the mandrel and chuck for advancing the filament wire along the mandrel to space the turns of the said wire as it is being coiled, and means adjustable to effect pivotal movement of the carriage through a predetermined angle in either direction about the mandrel axis and at a predetermined rate with respect to and coextensive with the rotation of the mandrel and chuck to thereby add or subtract a fraction of a turn from the coiled wire on the mandrel.

19. Apparatus for forming filamentary wire into coiled lamp filaments comprising a coiling head provided with a mandrel on which the filament wire is coiled and a ring-type chuck concentrically surrounding the mandrel, said chuck being arranged to grip, at any point therearound, an end of the filament wire to thereby hold it adjacent and across the mandrel, means for rotating the mandrel and chuck in unison about the mandrel axis to cause the filament wire to be coiled around the mandrel, a carriage mounted adjacent said coiling head and carrying means for guiding the filament wire transversely to the mandrel, means for moving the carriage longitudinally of the mandrel in a direction away from the coiling head and at a predetermined rate with respect to the rotation of the mandrel and chuck for advancing the filament wire along the mandrel to space the turns of the said wire as it is being coiled, means adjustable to effect pivotal movement of the carriage through a predetermined angle in either direction about the mandrel axis and at a predetermined rate with respect to and coextensive with the rotation of the mandrel and chuck to thereby add or subtract a fraction of a turn from the coiled wire on the mandrel, and cutter means mounted directly on said carriage for severing the portion of the filament wire extending between the mandrel and the guide means for said wire.

20. The method of winding a filamentary wire on a mandrel to form a coiled filament which comprises, presenting the wire transversely to the mandrel with an end portion projecting beyond the mandrel to form one leg of the filament, clamping the said end portion of the wire with respect to the mandrel, rotating the mandrel a given number of turns at a uniform speed and simultaneously moving the presented wire longitudinally of the mandrel at a uniform rate to thereby coil the wire around the mandrel, moving the presented wire rotatively about the mandrel through a predetermined angle and at a uniform speed throughout the rotation of the mandrel, and severing the presented wire at a point removed from the mandrel to form the other leg of the filament.

21. In filament coiling apparatus of the character described comprising a mandrel of which the wire is coiled, the combination of a carriage having a support slide and provided with means for guiding the filament wire transversely to the coiling mandrel, a pair of cutter knives pivotable on said carriage to sever the portion of the filament wire extending between the mandrel and the guide means for the wire, and an actuating slide carried by and slidable longitudinally of the carriage support slide to pivot the said cutter knives.

22. In filament coiling apparatus of the character described comprising a mandrel on which the wire is coiled, the combination of a carriage having a hollow support slide and provided with means for guiding the filament wire transversely to the coiling mandrel, a pair of cutter knives pivotable on said carriage to sever the portion of the filament wire extending between the mandrel and the guide means for the wire, and an actuating slide extending through said hollow support slide and slidable therein to pivot the said cutter knives.

23. In filament coiling apparatus of the character described comprising a mandrel on which the wire is coiled, the combination of a carriage having a support sleeve and provided with means for guiding the filament wire transversely to the coiling mandrel, a pair of cutter knives pivotable on said carriage to sever the portion of the filament wire extending between the mandrel and the guide means for the wire, spring means normally holding said cutter knives separated, and an actuating rod extending through said sleeve and slidable therein to pivot and close the said cutter knives.

24. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage movable longitudinally of the mandrel and carrying guide means for guiding the filament wire transversely to the mandrel, said guide means being movably mounted on said carriage for movement towards and away from the mandrel, cutter means mounted directly on said carriage and operable to sever the portion of the filament wire extending between the mandrel and the said guide means, and common actuating means arranged to withdraw the guide means away from the mandrel and actuate said cutter means.

25. In filament coiling apparatus of the type comprising a mandrel on which the filament wire is coiled, and filament wire gripper means adapted to hold an end of the filament wire adjacent and across the mandrel and rotatable as a unit with the mandrel about the mandrel axis to coil the filament wire around the mandrel, the combination of a carriage comprising an elongated hollow support slide movable longitudinally of the mandrel, a standard carried by and having a guideway extending transversely of said slide, a second slide mounted in said guideway to slide therein, guide means carried by said second slide for guiding the filament wire transversely to the mandrel, a pair of cutter knives pivotable on said standard to sever the portion of the filament wire extending between the mandrel and the guide means for said wire, and an actuating slide extending through said hollow support slide and slidable therein to actuate said second slide and pivot said cutter knives.

FRED B. IDEN.

REFERENCES CITED

The following references are of record in the file of this patent:

UNITED STATES PATENTS

| Number | Name | Date |
|---|---|---|
| 1,663,549 | Higgins et al. | Mar. 27, 1928 |
| 2,155,388 | Anderson et al. | Apr. 25, 1939 |
| 2,192,260 | Fisher et al. | Mar. 5, 1940 |
| 2,379,666 | Swartz et al. | July 3, 1945 |